Dec. 30, 1952     A. L. BARRETT     2,623,399
PIVOTED LINK CHAIN
Filed Oct. 21, 1948
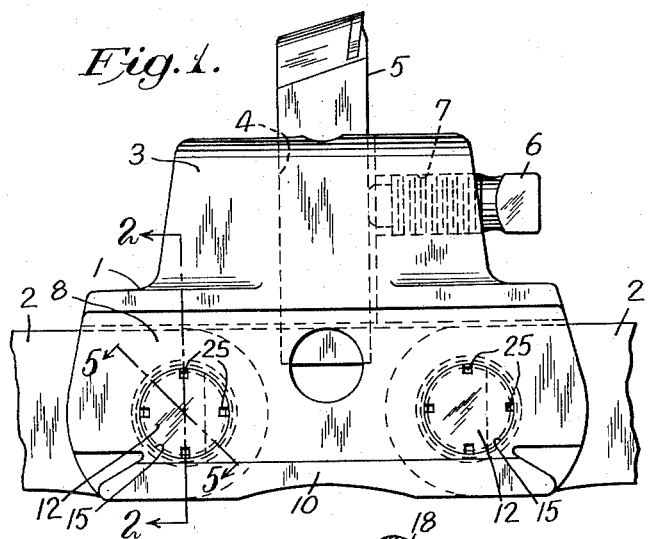
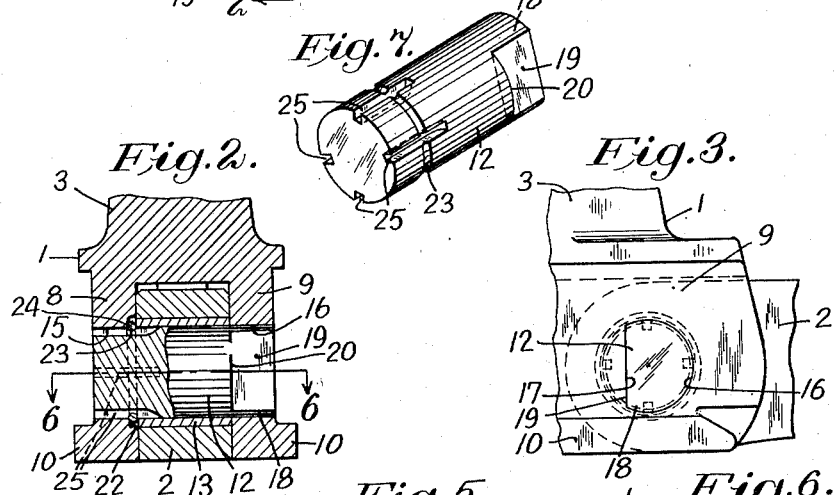
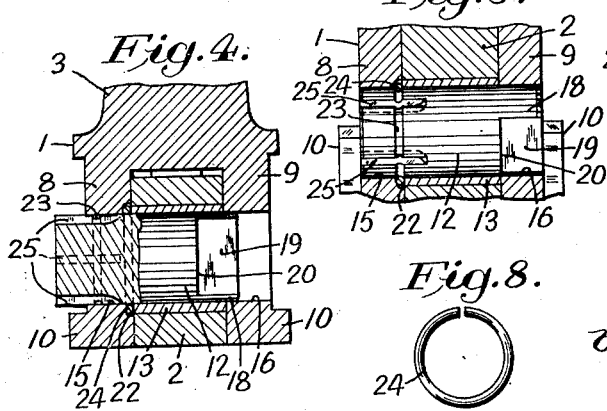
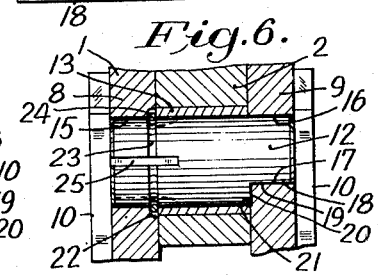
Inventor:
A. Lee Barrett
by Charles F. Osgood,
Attorney Patented Dec. 30, 1952

2,623,399

UNITED STATES PATENT OFFICE 2,623,399

PIVOTED LINK CHAIN

Arthur Lee Barrett, Franklin, Pa., assignor to Joy Manufacturing Company, Pittsburgh, Pa., a corporation of Pennsylvania Application October 21, 1948, Serial No. 55,813

9 Claims. (Cl. 74—254)

This invention relates to pivoted link chains and more particularly to improved means for securing the hinge pins or pintles against rotation and axial displacement with respect to certain of the chain links such as the chain blocks of a mining machine cutter chain.

In pivoted link chains and particularly in mining machine cutter chains it is desirable for economic reasons to secure the hinge pins or pintles to the more expensive parts such as the chain blocks so that wear is concentrated on the relatively cheaper parts such as the strap links and link wear bushings. While such locking means for pivoted link chains are well known, the present invention contemplates improvements over known types of locking means in that the locking means are readily releasable to permit detachment of the hinge pins or pintles and may be readily reassembled without replacement of parts or need for special tools. The locking means of the present invention may be in the form of a spring ring which snaps into a groove in the hinge pin when the latter is inserted in place on the chain block and which may be readily released when it is desired to detach the pin. The spring ring may be released by the insertion of ordinary screw drivers or similar readily available tools, in grooves cut into the pin inwardly of the ring and entering the ring receiving groove in the pin whereby the ring may be expanded and forced out of the groove. Thus the spring ring may be reused and, if damaged or worn, may be easily replaced at little cost.

An object of the present invention is to provide an improved pivoted link chain. Another object is to provide an improved chain having improved locking means for the hinge pins or pintles which pivotally connect the chain links together. A further object is to provide an improved locking means for locking the hinge pins against rotation and axial displacement with respect to the more expensive parts of the chain so that wear is concentrated on the cheaper parts. A still further object is to provide an improved mining machine cutter chain having improved means for locking the hinge pins to the chain blocks so that wear is concentrated on the strap links and link wear bushings. Yet another object is to provide improved releasable locking means for locking the hinge pins against rotation and axial displacement with respect to the chain blocks of a mining machine cutter chain. A still further object is to provide a spring locking ring arranged in grooves in the chain block and hinge pin for locking the latter against axial displacement relative to its associated chain link. Still another object is to provide improved means whereby the spring rings may be readily released when desired to permit ready detachment of the hinge pins from the chain links. These and other objects and advantages of the invention will, however, hereinafter more fully appear.

In the accompanying drawing there is shown for purposes of illustration one form which the invention may assume in practice.

In this drawing:

Fig. 1 is a side elevational view of a portion of a mining machine cutter chain in which an illustrative form of the invention is embodied.

Fig. 2 is a detail cross sectional view taken on line 2—2 of Fig. 1.

Fig. 3 is a fragmentary side elevational view looking toward the opposite side of the chain from that shown in Fig. 1.

Fig. 4 is a sectional view similar to Fig. 2, showing the spring ring in released expanded position with the hinge pin partially withdrawn from the chain block.

Fig. 5 is a detail sectional view taken on line 5—5 of Fig. 1.

Fig. 6 is a horizontal sectional view taken on line 6—6 of Fig. 2.

Fig. 7 is a perspective view of one of the hinge pins.

Fig. 8 is an elevational view showing the spring lock ring.

In this illustrative embodiment, as shown in the drawing, the improved locking means is embodied in a mining machine cutter chain which includes a chain block 1 which is pivotally connected to strap links 2. The chain block has a lateral lug 3 formed with a right angle socket 4 for receiving the shank of a conventional cutter bit 5. A set screw 6 threaded within an opening 7 in the front of the block lug is engageable with the bit shank for securing the bit firmly in cutting position on the chain block. The chain block has lateral side portions or side plates 8 and 9 at its base and these side portions are integral with the lug 3, and have lateral gibs 10 which are engageable with the guideway of a conventional mining machine cutter bar. Evidently, the invention may be embodied in pivoted link chains of various other types.

The chain block is pivotally connected by cylindrical hinge pins or pintles 12 secured to the block and pivotally engaged by the strap links 2 which project between the side portions 8 and 9 of the block base, as shown in Fig. 2. Fitted in bores on the strap links are wear bushings 13 which surround the cylindrical bodies of the hinge pins between the block-side-portions 8 and 9.

The side portions 8 and 9 of the block base have axially aligned openings 15 and 16 formed therein, the openings 15 being circular while the openings 16 are partially circular and each has a flat side 17. The hinge pins, upon assembly of the chain parts, are inserted endwise through the openings 15 and bores of the wear bushings 13 to bring cutaway end portions 18 of the pins into the openings 16. The cutaway portions of the pins have flattened surfaces 19 abutting the flat sides 17 to hold the pins against rotation relative to the block. The cutaway portions 18 also provide an outwardly facing shoulder 20 which engages, at 21, the inner surface of the block-side-portion 9. The inner face of the block-side-portion 8 is formed with annular recesses 22 which are concentric and communicate with the openings 15 respectively, and the body of each pin is annularly grooved at 23 about its periphery. Upon assembly of the chain parts, split spring rings 24, desirably magnetized so that they may remain in position without manual holding, are placed in contracted position within the recesses 22 so that they may be expanded by the pin bodies when the pins are placed in position. The pins are moved axially upon assembly through the spring rings within the openings 15 and 16 until the annular grooves 23 lie opposite the annular recesses 22 permitting the spring lock rings to snap inwardly into the pin grooves to lock the pins against axial displacement in the direction opposite to the direction of insertive movement of the pins. To permit release of the spring rings, when it is desired to detach the pins upon dismantling of the chain parts, the pins are formed with longitudinal slots or grooves 25 formed in the exterior periphery of the pin bodies and these slots cut into the annular grooves 23. Suitable ring releasing tools such as ordinary screw drivers may be inserted into the slots to expand the spring rings so that the hinge pins may be readily driven outwardly toward the left as viewed in Fig. 4.

As a result of this invention improved means is provided for locking the hinge pins or pintles of a pivoted link chain to certain of the chain links. By the provision of the improved locking means the hinge pins are locked against rotation and axial displacement with respect to the chain blocks of a mining machine cutter chain whereby wear is concentrated on the cheaper strap links and link wear bushings. The spring rings engaged in annular grooves in the chain links and hinge pins firmly lock the hinge pins against axial displacement while permitting ready detachment of the hinge pins and reassembly of the parts without the need of replacement of parts of the lock. The locking means is simple and rugged in design, well adapted to meet the demands of service. Other advantages will be obvious to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a pivoted link chain, a chain block having spaced parallel base portions, a strap link projecting between said parallel base portions, said parallel portions and said link having axially aligned openings, a hinge pin received in said openings for pivotally connecting said block and link, means for locking said hinge pin against axial displacement including an annular recess in the inner face of one of said base portions in concentric relation with the opening therein, an annular groove on the exterior periphery of said pin, and a spring locking ring engaged in said recess and said groove, and means for releasing said locking ring including longitudinal slots in said pin and entering said pin groove for receiving suitable ring expanding tools for releasing said ring from said pin groove.

2. In a pivoted link chain, associated chain links, a hinge pin pivotally connecting said links, and means for locking said pin against axial displacement with respect to one of said associated links including an outwardly facing surface on said pin near one end thereof and an annular groove on said pin near its opposite end, said pin-surface engaging an inwardly facing surface on said one of said associated links, and a spring ring arranged in said groove and engaging an inwardly facing surface on said one of said links opposed to said first link surface.

3. In a pivoted link chain, associated chain links, a hinge pin pivotally connecting said links, means for locking said pin against axial displacement with respect to one of said associated links including an outwardly facing surface on said pin near one end thereof and an annular groove on said pin near its opposite end, said pin surface engaging an inwardly facing surface on said one of said associated links and a spring ring arranged in said groove and engaging an inwardly facing surface on said one of said links opposed to said first link surface, and slots in said pin and entering said groove for receiving suitable ring expanding tools whereby said ring may be released from said pin groove to permit detachment of said pin from one of said links.

4. In a pivoted link chain, a chain block having parallel side portions at its base, a strap link projecting between said block-side-portions, said side portions and said link having axially aligned openings, a hinge pin received in said openings for pivotally connecting said block and link, and means for locking said pin against axial displacement with respect to said block including an outwardly facing shoulder near one end of said pin engaging the inner surface of one side portion, an annular groove formed about the pin periphery near its opposite end, and a spring ring arranged in said pin-groove and engaging an inwardly facing surface on said other block-side-portion.

5. In a pivoted link chain, a chain block having parallel side portions at its base, a strap link projecting between said block-side-portions, said side portions and said link having axially aligned openings, a hinge pin received in said openings for pivotally connecting said block and link, means for locking said pin against axial displacement with respect to said block including an outwardly facing shoulder near one end of said pin engaging the inner surface of one side portion, an annular groove formed about the pin periphery near its opposite end, and a spring ring arranged in said pin-groove and engaging an inwardly facing surface on said other block-side-portion, and longitudinal slots cut into said pin and entering said groove for receiving suitable ring expanding tools whereby the ring may be released from said pin-groove to permit detachment of said pin from said block.

6. In a pivoted link chain, associated chain links, a hinge pin pivotally connecting said links and adapted to be moved axially from said links upon release, said link and pin surfaces located internally of the chain so that they are normally inaccessible from the exterior of the chain, means for locking said hinge pin against axial displacement with respect to one of said associated chain links including a releasable split annular locking spring encircling said pin and when in normal contracted position engaging an outwardly facing surface on said pin and an inwardly facing surface on said one of said associated links, said one of said links having means permitting expansion of said spring out of locking relation with respect to said pin-surface thereby to permit axial displacement of said pin from said one of said links, and means provided by the chain for receiving a releasing instrument from the exterior of the chain whereby said locking spring may be expanded out of contact with said pin surface thereby to permit axial release of said pin.

7. In a pivoted link chain, associated chain links, a hinge pin pivotally connecting said links and adapted to be moved axially from said links upon release, means for locking said pin against axial displacement with respect to one of said associated chain links including a reusable expansible spring locking ring encircling said pin and when in normal contracted position engaging an outwardly facing surface on said pin and an inwardly facing surface on said one of said links, said one of said links having means permitting expansion of said locking ring radially from engagement with said pin surface thereby to permit axial displacement of said pin from said one of said links, said pin moving axially through said expanded ring upon such axial displacement thereof, said link and pin surfaces and said ring located internally of the chain so that said ring is normally inaccessible from the exterior of the chain, and means provided by the chain for receiving a releasing instrument from the exterior of the chain whereby said ring may be expanded out of contact with said pin surface to permit axial release of said pin.

8. In a pivoted link chain, associated chain links, a hinge pin pivotally connecting said links and releasable axially from said links, means for locking said hinge pin against axial displacement with respect to one of said associated links including an expansible spring lock encircling said pin and when in normal contracted position engaging opposed surfaces on said pin and said associated link, said one of said links having means normally inaccessible from the exterior of the chain permitting expansion of said spring lock into a position out of engagement with said pin-surface thereby to permit axial displacement of said pin from said one of said links, said pin moving axially through said spring lock during such axial displacement thereof, and means provided by said pin whereby a releasing instrument may be inserted from the exterior of the chain into a position to effect release of said spring lock.

9. In a pivoted link chain, associated chain links providing a pair of side link portions and an intermediate link portion, a hinge pin pivotally connecting said intermediate portion with said side portions, and means for locking said pin against axial removal from said side portions including an outwardly facing surface on said pin near one end thereof for preventing its axial removal in one direction and an annular groove on said pin near its opposite end, one of said portions having a surface facing oppositely to and engageable by said surface on said pin, and a spring ring arranged in said groove, said groove and one of said portions having generally oppositely facing surfaces engageable with said spring ring for preventing axial removal of said pin in the opposite direction.

ARTHUR LEE BARRETT.

REFERENCES CITED

The following references are of record in the file of this patent:

UNITED STATES PATENTS

| Number | Name | Date |
|---|---|---|
| 807,680 | Lewis | Dec. 19, 1905 |
| 2,398,107 | Morrow | Apr. 9, 1946 |
| 2,453,898 | Forbes | Nov. 16, 1948 |
| 2,476,617 | Mueller | July 19, 1949 |

FOREIGN PATENTS

| Number | Country | Date |
|---|---|---|
| 292,330 | Italy | Jan. 14, 1932 |